United States Patent [19]

Beyl

[11] Patent Number: 5,417,128
[45] Date of Patent: May 23, 1995

[54] ASSEMBLY CONSISTING OF A SAFETY CYCLE PEDAL AND A CYCLING SHOE, SAFETY CYCLE PEDAL AND CYCLING SHOE

[76] Inventor: Jean J. Beyl, 10, boulevard Victor-Hugo, 58000 Nevers, France

[21] Appl. No.: 56,491

[22] Filed: May 4, 1993

[30] Foreign Application Priority Data

May 27, 1992 [FR] France ............... 92 06504

[51] Int. Cl.$^6$ ............................................. G05G 1/14
[52] U.S. Cl. .................... 74/594.6; 74/594.4; 36/131
[58] Field of Search ............... 74/594.4, 594.6; 36/131, 132

[56] References Cited

U.S. PATENT DOCUMENTS

| | | | |
|---|---|---|---|
| 4,488,453 | 12/1984 | Drugeon et al. | 74/594.6 |
| 5,131,291 | 7/1992 | Beyl | 74/594.4 |
| 5,211,076 | 5/1993 | Baume et al. | 74/594.6 |
| 5,259,270 | 11/1993 | Lin | 36/131 X |

FOREIGN PATENT DOCUMENTS

| | | | |
|---|---|---|---|
| 0058438 | 8/1982 | European Pat. Off. | |
| 0155114 | 9/1985 | European Pat. Off. | |
| 0424210 | 4/1991 | European Pat. Off. | |
| 0531873 | 3/1993 | European Pat. Off. | 74/594.6 |
| 0557735 | 9/1993 | European Pat. Off. | 74/594.6 |
| 2653089 | 4/1991 | France | |
| 3832067 | 3/1990 | Germany | 74/594.6 |
| 4-372486 | 12/1992 | Japan | 74/594.4 |

Primary Examiner—Vinh T. Luong
Attorney, Agent, or Firm—Cushman, Darby & Cushman

[57] ABSTRACT

A cycling shoe and pedal are provided with interlocking members to allow quick release; the pedal has one face provided with a stop and fastener while the cycling shoe has a sole provided with a wedge housed in a recess in the sole; the stop and fastening member includes a front stop and a retaining member located in front of the axis of the pedal and a rear fastening member located behind the axis of the pedal and which is capable of displacement in a direction substantially perpendicular to the axis of the pedal against the action of an elastic member; the pedal has a front projection inclined towards the front with a lower edge which is situated, relative to the center plane of the pedal, on the side opposite the front stop member and the rear fastening member; the sole has a longitudinal guide capable of cooperating with the projection and with matting longitudinal guides provided on the pedal to ensure that the front part of the sole and the wedge slide relative to the pedal during the time the wedge approaches the front stop member and to prevent interference during this movement between the front of the wedge and the rear fastening member.

16 Claims, 5 Drawing Sheets

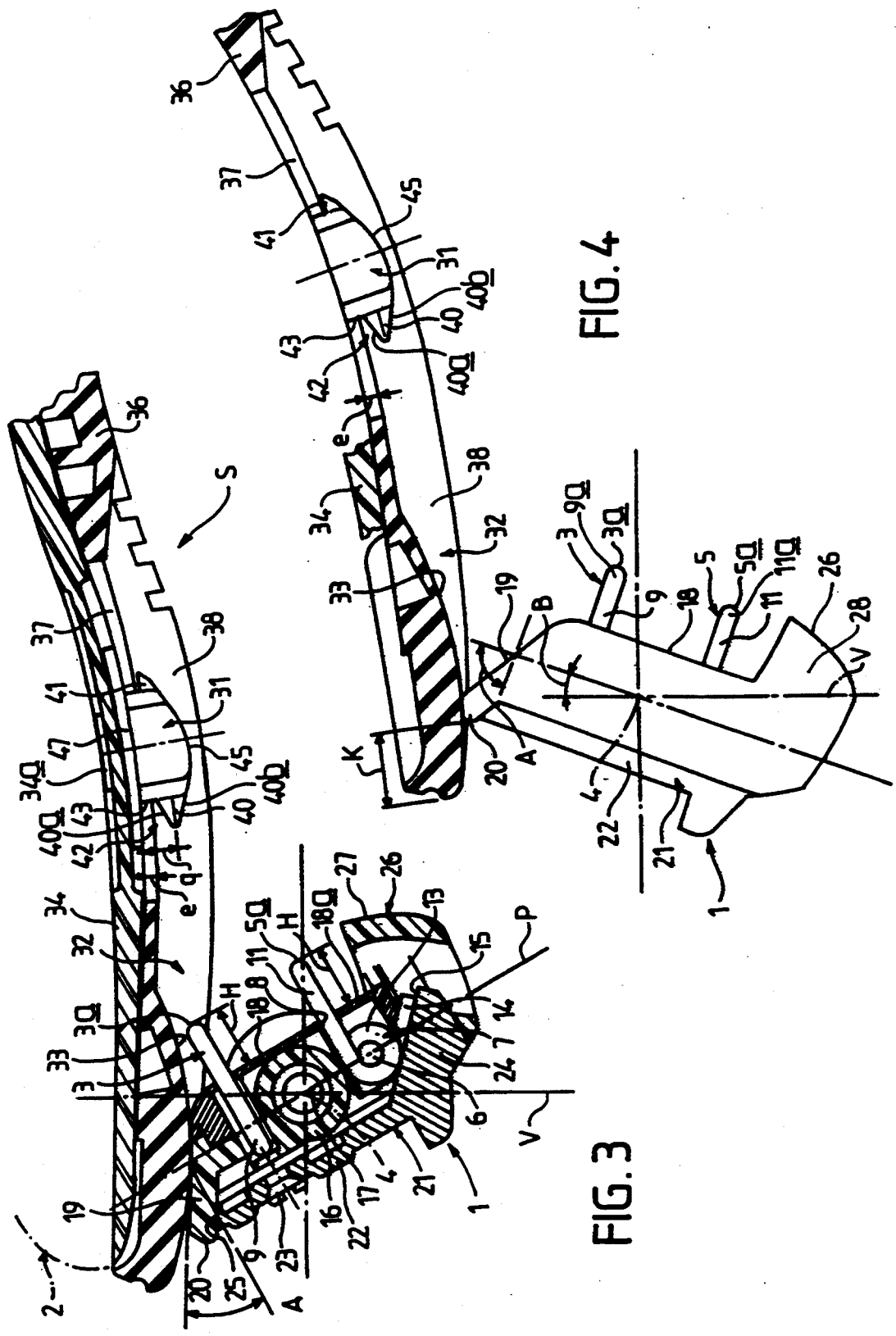

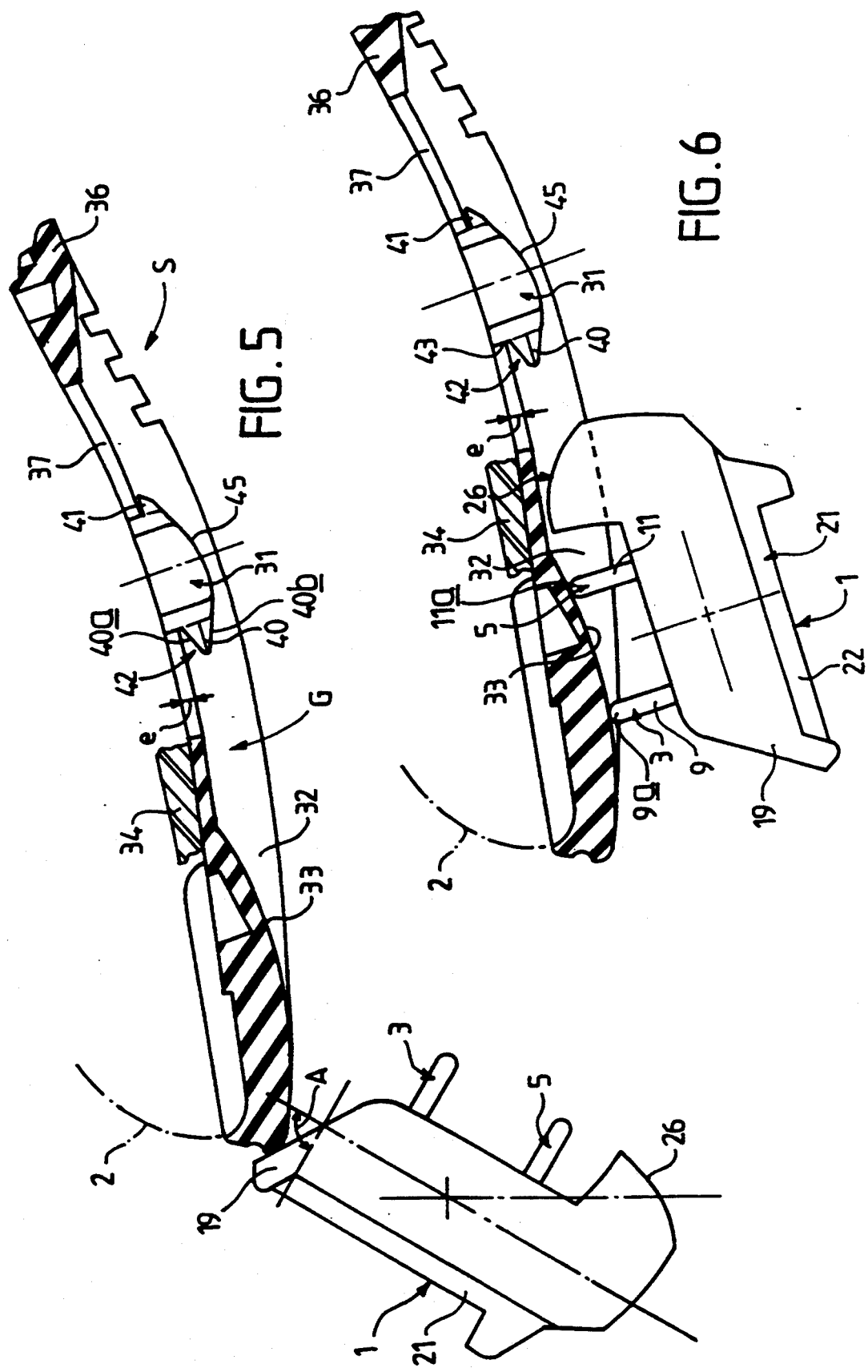

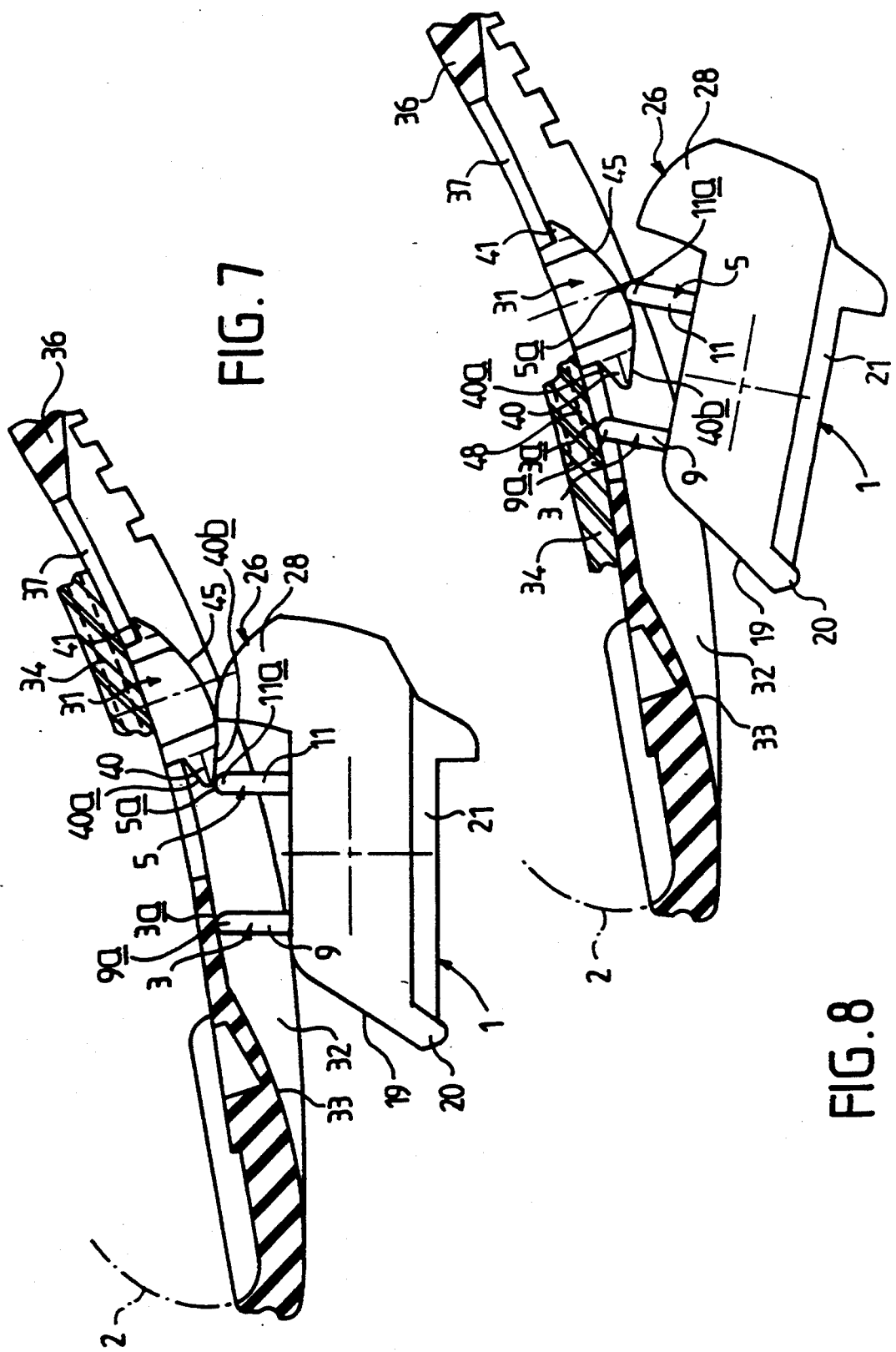

ASSEMBLY CONSISTING OF A SAFETY CYCLE PEDAL AND A CYCLING SHOE, SAFETY CYCLE PEDAL AND CYCLING SHOE

FIELD OF THE INVENTION

The invention relates to an assembly consisting of a safety cycle pedal provided on one face with stop and fastening means and a cycling shoe having a sole provided with a wedge housed in a recess in the sole, this wedge being situated in a region adapted to be situated substantially under the metatarsus of the foot of the cyclist, the said wedge having a small dimension in the longitudinal direction of the sole so that the front end of the wedge is situated in a substantially recessed manner with respect to the toe of the sole, the stop and fastening means of the pedal comprising a front stop and retaining member substantially parallel to the normally horizontal axis of the pedal and situated in front of this axis, and a rear fastening member situated behind the axis of the pedal and capable of being displaced in a direction substantially perpendicular to the axis of the pedal against the action of elastic return means, the assembly being such that a cyclist wearing the shoe can fasten the sole to the pedal by exerting substantially vertical pressure on the said pedal, while he can free the sole from the pedal by a twisting movement of his foot.

DESCRIPTION OF THE PRIOR ART

FR-A-2653089 relates, inter alia, to a safety cycle pedal of the type defined hereinbefore, adapted to be combined with a wedge housed in a recess in the sole of a cycling shoe in such a manner that it does not disturb the cyclist when walking. This type of pedal and the cycling shoe provided with the appropriate sole form an assembly which is satisfactory, especially for touring where: the shoe does not have to be fastened and unfastened too often.

On the other hand, in cross-country cycling or cyclo-cross, the cycling shoe frequently has to be fastened and unfastened. The fastening operations must be as simple and rapid as possible in order to prevent any loss of time. In particular, it is desirable for the cyclist to be able to fasten the shoe to the pedal "blind", i.e. without having to look at the pedal during fastening.

SUMMARY OF THE INVENTION

The aim of the invention is above all to provide a safety cycle pedal and cycling shoe assembly such that the cyclist can definitely put on and fasten the shoe rapidly without looking.

Another aim of the invention is to provide a safety cycle pedal and cycling shoe assembly, the operation of which remains reliable even if the cyclist has to walk over relatively wet ground which may stick to the sole and/or the wedge.

It is moreover desirable for the safety pedal of an assembly of this kind still to have a simple, sturdy design.

According to the invention, a safety cycle pedal and cycling shoe assembly such as the one defined hereinbefore is characterised in that the pedal comprises at the front a projection inclined towards the front, the lower edge of which is situated, relative to the centre plane of the pedal, on the side opposite the front stop member and the rear fastening member, that the pedal is adapted to assume a rest position situated within a range such that the lower edge of the front projection is situated above: the pedal and in front of the vertical plane passing through the axis of the pedal, and that the sole has longitudinal guide means capable of cooperating with the said projection and with mating longitudinal guide means provided on the pedal in order to ensure that the front part of the sole and the wedge slide relative to the pedal during the phase in which the wedge approaches the front stop member, and to prevent interference during this approach phase between the front of the wedge and the rear fastening member.

The pedal is preferably provided with a counter-weight and is adapted so that in its normal rest position its centre plane is inclined by approximately 30° towards the front with respect to the vertical plane passing through the horizontal axis of the pedal, the projection of the pedal being situated towards the top, the lower edge of the front projection remaining in front of the said vertical plane, even if the pedal assumes a position inclined slightly towards the rear for any reason.

The pedal is advantageously arranged in such a manner that the lower edge of the said projection remains in front of the vertical plane passing through the horizontal axis of the pedal over an angular range of positions of the pedal up to a position inclined towards the rear by approximately 30°.

Therefore, according to the invention, although the stop and fastening means of the pedal are only provided on one face, during the phase in which the shoe is fastened to the pedal, the sole of the cyclist will strike the lower edge of the front projection of the pedal in front of the vertical plane passing through the axis of the pedal. Under these conditions, downward pressure exerted on this edge will result in rotation of the pedal in the appropriate direction, placing the stop and fastening means above the axis of the pedal.

The front projection of the pedal preferably has a contour substantially in the shape of a trapezium, the small base of which forms the said front lower edge. The surface of this front projection can be substantially flat or slightly convex towards the front.

The longitudinal guide means provided in the sole advantageously comprise, in the front part of the sole surrounding the zone in which the wedge is situated, a sort of longitudinal cavity in the form of a tunnel opening towards the front of the sole at a short distance from the front end point of the sole. The front part of this tunnel is limited at the bottom by a smooth wall promoting the sliding of the stop and fastening means of the pedal against its bottom, the said tunnel being defined by lateral walls.

The mating longitudinal guide means of the pedal may comprise behind the pedal a sort of cap, the upper surface of which is capable of sliding against the bottom of the tunnel of the sole and/or against the wedge to prevent inadvertent fastening of the front part of the wedge to the rear fastening member of the pedal. The said wedge preferably comprises a curved central part facilitating the sliding of this wedge on the said cap. The lateral surfaces of the cap are advantageously adapted to facilitate unfastening of the shoe from the pedal upon a twisting movement of the foot of the user, by the cooperation of one of the lateral surfaces of the cap with one of the lateral walls of the tunnel of the sole.

The depth of the tunnel and the profile along its bottom are determined as a function of the dimensions of the pedal, the cap and the wedge in order to ensure that, during the forward movement of the shoe, the wedge passes above the rear fastening member, and then the front of the pedal pivots upwards sufficiently for fastening.

The sole of the shoe preferably also has lateral guide means capable of cooperating with mating guide means provided on the pedal in order to ensure that the wedge is positioned relative to the pedal in a direction parallel to the axis of the pedal.

These lateral guide means provided on the sole advantageously comprise the lateral walls of the tunnel of the sole which are oblique with respect to the mid-perpendicular longitudinal plane of the sole, in such a manner that a cross section of the tunnel is in the shape of a trapezium, the large base of which is situated towards the bottom and the small base of which is situated in the bottom of the tunnel, while the mating lateral guide means of the pedal are formed by transversely inclined or rounded surfaces provided on the lateral edges of the front stop member of the pedal and the rear fastening member, so that the cooperation of an oblique lateral wall of the tunnel and a rounded or inclined surface brings the sole and the wedge naturally into the correct fastening position. The width of the section of the tunnel in its lower part is preferably approximately 15 mm greater than the dimension of the front stop member and the rear fastening member of the pedal in the direction parallel to the axis of the pedal, while the width of the section of the tunnel at the zone of the lateral walls of the tunnel against which a lateral edge of the front stop member can come to rest is selected to allow for a small degree of freedom to slide laterally, especially of approximately 5 mm.

The front stop member is advantageously formed by a bow, generally of metal wire of circular section, this bow having a bar substantially parallel to the axis of the pedal and situated above the plane of the pedal, and two parts substantially perpendicular to the plane of the pedal forming uprights and being connected to the transverse bar by rounded portions. The arrangement of the rear fastening member is similar. The rounded portion of the connection between the transverse bar and the uprights of the bow has a sufficient radius to ensure good lateral guiding of the sole by cooperating with the oblique lateral wall of the tunnel of the sole. The inner radius of curvature of the rounded portions of the corners of the bow is preferably greater than or equal to 6 mm.

The wedge fixed under the sole is provided at the front and at the rear in its central part with extensions of small width, projecting in the longitudinal direction and capable of engaging under the transverse bar of the corresponding bow of the pedal. The inlet opening associated with each extension has a dimension greater than the diameter of the bar, while at the bottom of the housing the dimension of the space left is substantially equal to the diameter of the bar of the bow.

The wedge is advantageously provided in its part adapted to come into contact with the sole with two substantially rectangular blades convex towards the exterior, separated by a central longitudinal space and extending in the longitudinal direction of the sole, these blades being capable of being received in recesses provided in the sole in Order to ensure longitudinal guiding of the wedge relative to the sole when it is adjusted.

The pedal/shoe assembly is preferably adapted in such a manner that when the pedal is struck by the sole of the shoe in a movement from the rear towards the front and from top to bottom for fastening, the pedal tilts substantially horizontally by the initial cooperation of the projection of the pedal with the sole, then the transverse bar of the front bow bears against the bottom of the tunnel of the sole while the rear cap comes to rest against the sole or the wedge as the sole slides forward relative to the pedal, the cap being released from this contact when the wedge is fastened correctly to the pedal.

The invention also relates to a safety cycle pedal, especially for cross-country cycling or cyclo-cross, provided on one face with stop and fastening means comprising a front stop and retaining member substantially parallel to the normally horizontal axis of the pedal and situated in front of this axis and a rear fastening member situated behind the axis of the pedal and capable of being displaced in a direction substantially perpendicular to the axis of the pedal against the action of elastic return means, this pedal being characterised in that it has a projection inclined towards the front and the lower edge of which is situated, relative to the centre plane of the pedal, on the side opposite the front stop member and the rear fastening member, the pedal being adapted to assume a normal rest position such that the projection is situated above and in front of a vertical plane passing through the horizontal axis of the pedal.

The pedal is preferably provided with a counterweight and is adapted to assume a normal rest position inclined by approximately 30° with respect to the vertical, the projection being adapted in such a manner that its lower edge remains in front of the vertical plane passing through the horizontal axis of the pedal, even if the pedal assumes a position inclined towards the rear by up to approximately 30°.

The pedal comprises at the rear a sort of cap, the upper, especially convex, surface of which is capable of sliding against the sole of a cycling shoe provided with a wedge to prevent inadvertent fastening of the front part of the wedge to the rear fastening member of the pedal.

The front stop member and the rear fastening member are advantageously formed respectively by a bow of metal wire having a bar substantially parallel to the axis of the pedal and situated above the plane of the pedal, and two parts substantially perpendicular to the plane of the pedal which form uprights connected to the transverse bar by rounded portions. The rounded connecting portion has a sufficient radius to define an outer convex surface promoting guiding. The inner radius of curvature of this rounded portion is preferably greater than or equal to 6 mm.

The pedal may be provided on either side of the bows in a direction parallel to the axis of the pedal with support bosses capable of cooperating with the lower surface of the sole when the sole has been fastened to the pedal.

The invention also relates to a cycling shoe adapted to cooperate with a pedal of this kind, this shoe having a sole provided with a wedge housed in a recess, the said wedge having a small dimension in the longitudinal direction of the sole so that the front end of the wedge is situated in a substantially recessed manner with respect to the toe of the sole, this shoe being characterised in that the sole is provided in its central longitudinal part with a sort of tunnel opening towards the front of the sole at a short distance from the front end point of the sole, this tunnel extending at least from the front end of the wedge, the bottom of this tunnel being formed by a smooth wall promoting sliding. The tunnel is advantageously limited by oblique lateral walls so that the cross section of this tunnel is in the shape of a trapezium, the large base of which is situated towards the bottom. The width of the section of the tunnel in its lower part is approximately 15 mm greater than the dimension of the front stop member of the pedal along the axis of this pedal, while the width of the tunnel at the zone of the lateral walls of the tunnel against which a lateral edge of the front stop member can come to rest is selected to allow for a small degree of freedom to slide laterally, especially of approximately 5 mm.

The sole is advantageously made in two parts, namely a rigid insole in which longitudinal openings are provided for the passage of fixing screws for the wedge and adjusting the length, and an outsole of a more flexible material in which the said tunnel is provided. A hole in the outsole provides access to these longitudinal openings.

The parts of the outsole projecting on either side of the recess of the tunnel have zones capable of bearing against the pedal on either side of the stop and fastening members.

In addition to the arrangements described hereinabove, the invention consists of a number of other arrangements which will be described in more detail ;hereinafter by way of a non-limiting embodiment described with reference to the accompanying drawings, in which:

DESCRIPTION OF THE DRAWINGS

FIG. 3 is a sectional side view, with parts on the exterior, of the pedal occupying substantially its normal rest position and of the sole of the shoe at the beginning of the approach phase for fastening;

FIG. 4 like FIG. 3, shows the beginning of an approach phase for fastening the sole while the pedal occupies a position inclined towards the rear as a result, e.g. of vibrations;

FIG. 5 to 8 like FIG. 3, show various phases of the fastening operation of the shoe;

DETAILED DESCRIPTION OF THE INVENTION

Figure 1:
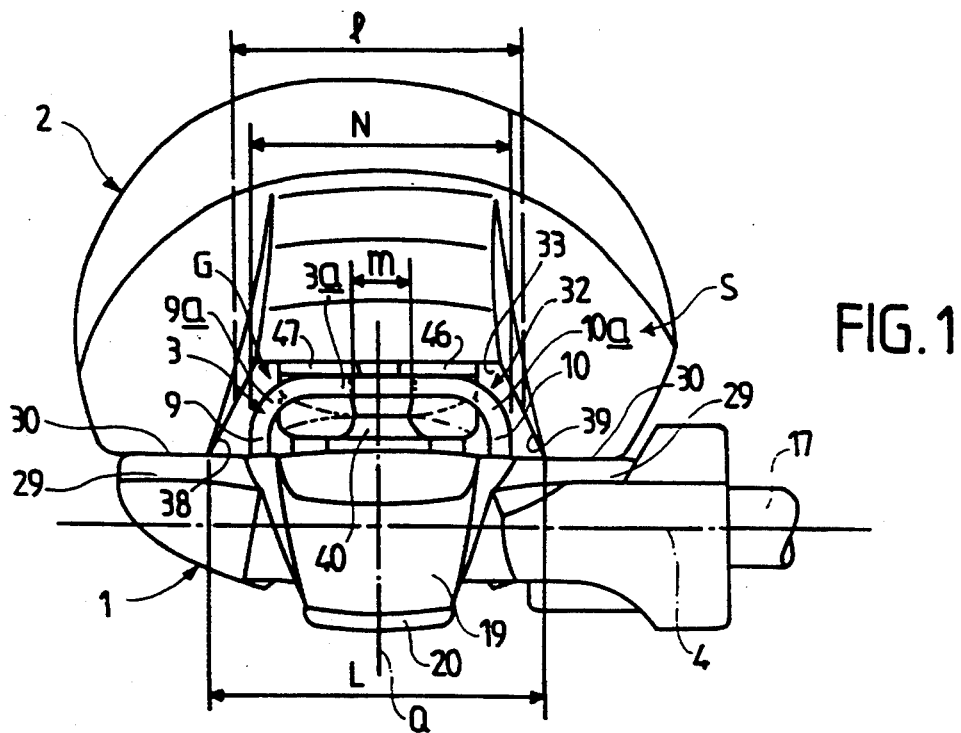
FIG. 1 is a front view of the assembly consisting of a right safety cycle pedal and a cycling shoe fastened to this pedal according to the invention.

Referring to the drawings, especially FIGS. 1, 3 and 4, they show the assembly consisting of a safety cycle pedal 1 and a cycling shoe 2 specially adapted to be fastened to this pedal.

Figure 2:
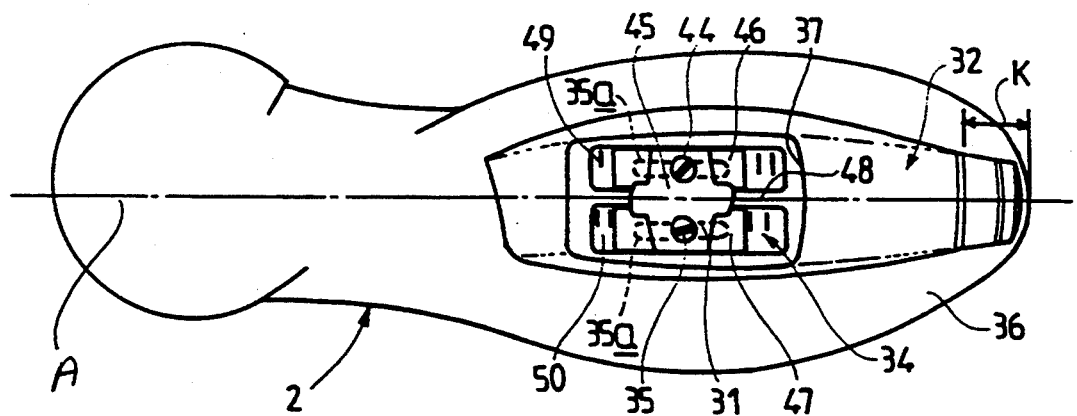
FIG. 2 is a bottom view on a reduced scale of the sole of a left shoe according to the invention.

The views of FIGS. 3, 4, 5, 6, 7, 8 and 9 are all taken transverse to the central axis A of FIG. 2.

The pedal 1 is provided on one single face with stop and fastening means comprising a front stop and retaining member 3 fixed to the pedal and situated in front of the axis 4 of the normally horizontal pedal and a rear fastening member 5 situated behind the axis 4. This rear fastening member is capable of being displaced substantially in a direction perpendicular to the axis 4 of the pedal. In the example in question, the member 5 can rotate about a spindle 6 situated behind the axis 4 of the pedal in such a manner that the tangent to the point of departure of the trajectory of the member 5 is substantially perpendicular to the axis 4. Elastic return means 7 are provided to return the member 5 to the fastening position shown in FIG. 3, resting against a support 8.

The front stop member 3 is formed by a bow of metal wire, especially stainless steel wire (see FIG. 10) generally of circular section. This bow has a bar 3a substantially parallel to the axis of the pedal. This bar 3a is situated above the upper plane of the pedal. The bow comprises two parts substantially perpendicular to the upper plane of the pedal forming uprights 9 and 10 connected to the transverse bar 3a by rounded portions 9a, 10a. The uprights 9 and 10 are fixed in the body of the pedal.

The rear fastening member 5 is also formed by a bow of metal wire having a bar 5a parallel to the axis 4 and two uprights 11, 12 perpendicular to the upper plane of the pedal in the rest position of the member 5. The transverse bars 3a and 5a are situated at the same distance H above the upper plane of the pedal. Rounded portions 11a, 12a ensure the connection between the uprights 11, 12 and the bar 5a.

The ends of the uprights 11 and 12 remote from the transverse bar 5a are rolled in the opposite direction so as to form two torsion springs such as 13 forming the elastic return means 7. The spindle 6 is engaged inside these torsion springs 13. The end turn of each torsion spring has an extension strand 14 in a tangential direction bearing against a stop surface 15 provided on the pedal.

The body of the pedal is provided between the two bows with a sleeve 16 in which a bore is provided to receive part of the shaft 17 of the pedal, the outer end of this shaft being threaded (see FIG. 10) for mounting the pedal on a crank.

The upper surface of the pedal is formed by a plate 18 fixed to the body of the pedal, having passages for the uprights 9, 10 of the front bow and longitudinal openings such as 18a for the passage of the uprights 11, 12 of the rear bow. The openings 18a have a sufficient length to allow for clearance of the uprights 11 and 12 towards the rear by rotation about the spindle 6, ensuring unfastening of the wedge.

The front end of the pedal 1 is formed by a projection 19 inclined towards the front with respect to the centre plane P (FIG. 3) of the pedal, This centre plane P passes through the axis 4 and is parallel to the upper plane of the pedal.

The angle of inclination A between the projection 19 and the direction perpendicular to the plane P is approximately 30°. The lower edge 20 of the projection 19 is situated, relative to the centre plane P, on the side opposite the front stop bar 3a and the rear fastening bar 5a.

The pedal 1 is adapted to assume a rest position corresponding to that shown in FIG. 3, such that the projection 20 is situated above and in front of the vertical plane V passing through the horizontal axis 4 of the pedal. For an arrangement of this kind, the pedal 1 has a counterweight 21, e.g. made of a moulded metal alloy, formed by a sort of plate 22 fixed under the pedal by screws 23 and provided at the rear with a bulging part 24 on which the weight of the counterweight is centered. The upper surface of the bulging part 24 is oblique rising towards the rear and forms the stop surface 15 mentioned hereinbefore. By virtue of the fact that the counterweight 21 is fixed to the body of the pedal with the aid of screws 23, it is possible for the torsion springs such as 13 to be preloaded by the action of the surface 15 against the extension strand 14, the uprights 11 and 12 of the bow resting towards the front against the support 8. The front end 25 of the plate 22 comes to rest against the inner face of the projection 19 of the pedal.

The projection 19 has a contour substantially in the shape of a trapezium, as can be seen in FIGS. 1 to 10, the small base of the trapezium being situated towards the bottom and being formed by the edge 20. The surface of the projection 19 can be flat. If necessary, it may display slight convexity towards the front.

The projection 19 and the pedal 1 are adapted in such a manner that the edge 20 remains in front of the vertical plane V even if the pedal 1, as shown in FIG. 4, e.g. as a result of vibrations or an inertial movement, assumes a position inclined towards the rear at an angle B (between the centre plane P of the pedal and the vertical plane V) which can be up to approximately 30°.

Figure 10:
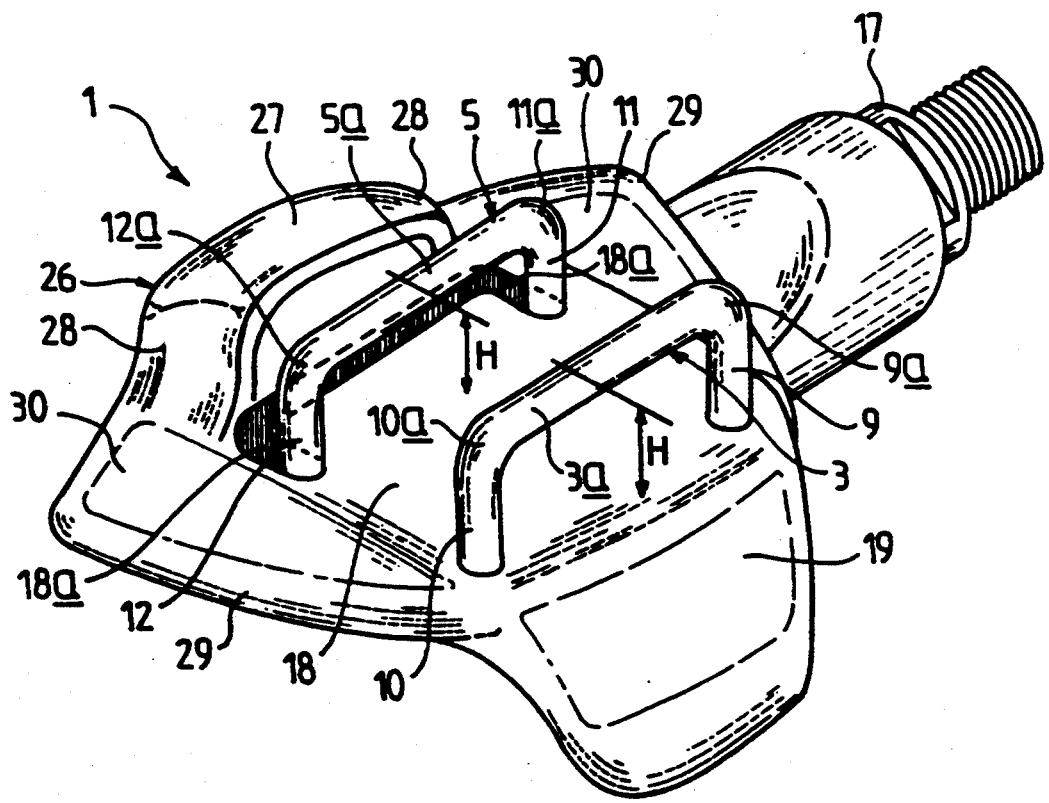
FIG. 10 is a perspective view from the right front of a right pedal according to the invention.

The pedal 1 is provided at the rear with a sort of cap 26, the upper surface 27 of which is capable of sliding against the sole S of the shoe 2. The front edge of the upper surface 27 extends transversely, as can be seen in FIG. 10, at a distance from the upper surface 18 of the pedal which is preferably slightly greater than the distance H (see FIG. 3) between the rear bar 5a and the said upper surface of the pedal. The cap 26 comprises on each side walls such as 28 directed towards the pedal and capable of cooperating with the sole, as will be described hereinafter, in order to facilitate unfastening.

The upper part of the pedal projects laterally beyond either side of the bows by sort of triangular lugs 29 (see FIG. 10), the width of which increases towards the rear. These lugs 29 are provided with portions of excessive thickness 30, forming bosses capable of cooperating with parts of the sole S.

The sole S of the shoe has longitudinal guide means G capable of cooperating with mating longitudinal guide means provided on the pedal 1 and comprising the projection 19, the rounded portions 9a, 10a, 11a, 12a of the bows and the cap 26.

The means G comprise, in the front part of the sole S surrounding the zone in which a wedge 31 for fixing to the pedal is situated, a sort of longitudinal cavity forming a tunnel 32. The tunnel 32 opens towards the front of the sole at a short distance K (see FIG. 4) from the front end point of the sole. K can be of the order of 35 mm.

The front part of the tunnel 32 is limited at the bottom by a smooth wall 33 promoting sliding. The sole S generally comprises a rigid insole 34 (FIG. 3) in which longitudinal openings 35a are provided (FIG. 2) for the passage of fixing screws 35 (FIG. 2) for the wedge 31, each screw 35 being engaged in a threaded hole provided in a metal plate 34a (FIG. 3) situated on the inner side of the insole 34. The longitudinal openings 35a allow for adjustment of the longitudinal position (or adjusting the length) of the wedge 31 by sliding of the screws. The insole 34 is covered underneath by an outsole 36 of a more flexible material than that of the insole 34, especially an elastomer. The outsole 36 has a hole 37 (see FIG. 2) in the bottom of the tunnel 32 so as to provide access to the insole 34 in the zone of the openings serving for the passage of the screws 35. The hole 37 has a sufficient length to allow for adjustment of the longitudinal position of the wedge 31 according to the morphology of the cyclist.

It should be noted that the rigid insole 34 prevents the cyclist having the unpleasant impression that the wedge 31 and/or the bows 3, 5 are "digging into" his foot when he presses firmly on the pedal, or the opposite impression when he pulls on the pedal. By virtue of the rigidity of the sole, the stresses can be distributed over the entire surface of the sole.

For walking, the more flexible sole 36 reduces the rigidity of the insole 34.

The smooth wall 33 can rise from the front towards the rear as it approaches the insole 34. The sole 36 has a small thickness e at the front edge of the hole 37 (see FIG. 4).

The tunnel 32 is defined by lateral walls 38, 39 which are also smooth and are oblique with respect to the centre longitudinal vertical plane Q (FIG. 1) of the sole. The walls 38, 39 move apart from one another towards the bottom. The cross section of the tunnel 32, as can be seen in FIG. 1, is in the shape of a trapezium, the large base of which is situated towards the bottom and the small base of which is situated at the bottom 33. The walls 38 and 39 can be flat or slightly curved.

The width L (see FIG. 1) of the section of the tunnel 32 in its lower part is approximately 15 mm greater than the dimension N of the front stop member 3 and the rear fastening member 5 of the pedal 1 in a direction parallel to the axis 4. This dimension N is equal to the distance between the outer surfaces of the uprights such as 9 and 10. The width 1 at the zone of the walls 38, 39 capable of resting transversely against the member 3 or 5 when the shoe is fastened in position is provided to ensure lateral play, especially of approximately 5 mm. The cyclist can thus freely adjust the lateral position of his foot.

The oblique lateral walls 38, 39 of the tunnel form lateral guide means capable of cooperating with the rounded portions 9a, 10a of the front bow of the pedal. These rounded portions 9a, 10a, like the rounded portions 11a, 12a and the projection 19, form mating lateral guide means for the pedal.

The wedge 31 made of metal, especially a copper-aluminium alloy, is provided at the front and at the rear with respective extensions 40, 41 having a small width m (see FIG. 1), e.g. of the order of 10 mm. The width m refers to the dimension of the extensions 40, 41 in a direction parallel to the axis 4 of the pedal. The extensions 40, 41 are situated substantially half-way along the width of the wedge 31 and are capable of cooperating witch the respective transverse bars 3a, 5a of the front stop member 3 and the rear fastening member 5.

The longitudinal faces 40a, 40b (see FIG. 3) of the extension 40 are inclined from the rear to the front so that the thickness of the extension 40 decreases towards the front. An inclination in the opposite direction is provided for the rear extension 41.

The inlet opening 42 associated with the front extension 40 has a dimension q in a direction substantially perpendicular to the adjacent surface of the sole:, e.g. 2 or 3 mm greater than the diameter of the metal wire forming the transverse bar 3a. On the other hand, at the rear part of the extension 40, the dimension 43 of the space provided for the bar 3a is substantially equal to the diameter of the wire of this bar 3a.

A similar arrangement is provided at the rear extension 41.

In the zone of the wedge 31 included between two holes 44 provided for the passage of the fixing screws 35 (see FIG. 2), the wedge has a smooth surface 45 convex towards the exterior capable of promoting sliding of the wedge over the cap 26 and over the bar 5a during the approach phase for fastening.

The wedge 31 is provided in its part adapted to be situated in contact with the sole with two substantially rectangular blades 46, 47 (see FIG. 2) convex towards the exterior and separated by a central longitudinal space engaged by a longitudinal rib 48 provided in the insole 34.

The blades 46, 37 are received in rectangular recesses 49, 50 provided in the rigid insole 34 and are capable of ensuring via their walls the guiding of the wedge for adjustment thereof in the longitudinal direction.

This being the case, a cycle pedal/cycling shoe assembly according to the invention is used and operated as follows.

When the pedal 1 is free, it occupies a normal rest position shown in FIG. 3 corresponding to an inclination towards the front of approximately 30° the axis 4 being horizontal or substantially horizontal.

The shoe 2 is fastened to the pedal 1 by a natural movement of the foot from the rear to the front, the pedal 1 preferably being situated in the middle of the downward phase of the crank to which it is fixed, i.e. this crank is substantially horizontal.

The toe of the sole S strikes the projection 19 of the pedal as shown in FIG. 3 and the cyclist can engage this projection 19 in a simple manner in the inlet of the relatively wide tunnel situated in the vicinity of the toe of the sole without having to look at the pedal. As soon as the sole exerts downward pressure on the projection 19, the pedal 1 tilts towards a substantially horizontal position, the bows 3 and 5 being situated on the correct side of the pedal, i.e. above the axis 4.

The upper part of the bow 3 and the bar 3a enter into the tunnel 32, as shown in FIG. 3.

As the shoe and the sole move downwards and forwards, the bow 3 comes to rest via its bar 3a against the bottom 33 of the tunnel 32 and the projection 19 of the pedal is tilted towards the front as shown in FIG. 6, with the inlet of the bar 5a and the upper part of the rear bow 5 in the tunnel 32, and the inlet of the cap 26 in this tunnel.

The sliding from the rear to the front is effected under good conditions as the surface of the bottom 33 of the tunnel 32 is smooth, while the lateral guiding is effected by the cooperation of the inclined walls 38, 39 of the tunnel 32 with the lateral rounded portions 9a, 10a and 11a, 12a of the bows 3 and 5.

During this sliding movement towards the front, the bar 3a ensures a sort of scraping of the tunnel 32 and of the bottom wall of this tunnel.

The shoe continues to move forwards and downwards as shown in FIG. 7. The pressure on the bar 3a keeps the rear of the pedal in contact with the sole or the wedge 31. The dimensions of the bottom of the wedge 31 and the upper part of the cap 26 are designed so that the front extension or tip 40 of the wedge does not fasten the horizontal bar 5a of the rear fastening member 5.

As shown in FIG. 8, the traversing of the bar 5a by the wedge 31 is facilitated by the curved part 45 provided under this wedge. When this curved part 45 presses against the bar 5a, the other front bar 3a bears firmly against the bottom of the tunnel and allows, e.g. for the removal or loosening of any earth which may have accumulated in the bottom of the tunnel 32 just in front of the tip 40.

Figure 9:
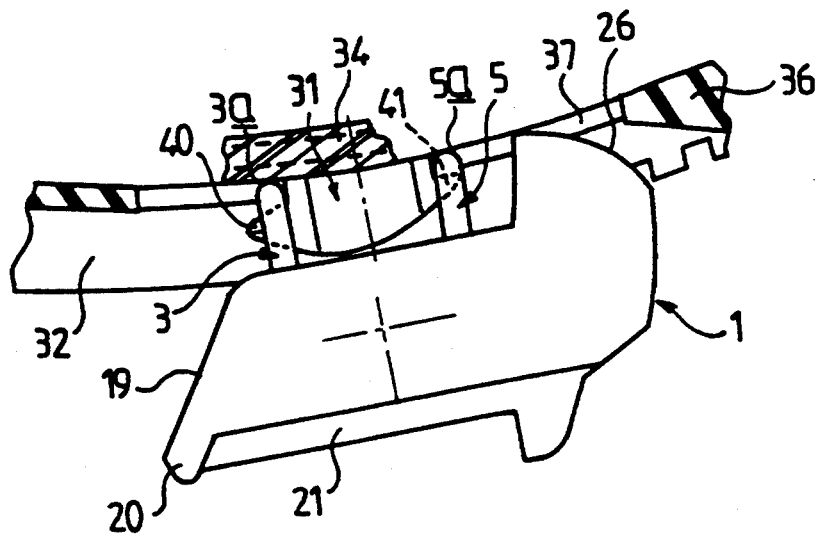
FIG. 9 is a partial diagram of the shoe correctly fastened to the pedal, and finally

As a result of this agitation of the earth or mud and as a result of the fact that the extension 40 has a small width, the bar 3a is fastened to the extension 40 under good conditions when the cyclist continues the forward movement of the shoe from the position in FIG. 8 in order to engage the extension 40 under the bar 3a. At this point, the bar 5a of the rear fastening member 5 is released by the wedge 31. The bow 5 which had been moved away towards the rear as a result of the vertical pressure exerted on the bar 5a returns towards the front by the action of the return springs 13 in a rotational movement in an anti-clockwise direction according to the representation of the drawings about the spindle 6. The bar 5a then engages the space situated above the extension 41, as shown in FIG. 9.

The fastening operations are therefore effected under good conditions with the pedal sort of rolling against the bottom of the tunnel 32.

It should be noted that the depth of the tunnel 32 and the profile along its bottom are determined as a function of the dimensions of the pedal and especially the bows 3 and 5, the cap 26 and the wedge 31 in order to ensure that the wedge 31 passes above the bar 5a of the rear bow, and then the bar 3a of the front bow pivots upwards sufficiently for fastening.

More precisely, as can be seen in FIG. 7, the depth of the tunnel 32 in the zone situated at right angles with the bar 3a when the extension 40 arrives at right angles with the bar 5a of the rear bow is such that the pressure of the bar 3a against the bottom of the tunnel and the pressure of the cap 26 against the wedge 41 define an angular position of the pedal 1 in which the bar 5a of the rear bow is situated below the extension 40, preferably substantially in contact with its lower surface 40b.

The depth of the tunnel increases in the vicinity of the wedge 31 as at the hole 37 which forms part of the tunnel the thickness of the outsole 36 is no longer present. The bottom of the tunnel is thus defined by the lower surface of the rigid insole 34. In this manner, when the shoe continues its forward movement and arrives in the position of FIG. 8, the increase in the depth of the tunnel 32 of the sole allows the front of the pedal 1 to pivot upwards until the bar 3a comes to rest against the bottom of the tunnel. The bar 3a is thus situated in a good position to engage the extension 40.

The shoe is unfastened from the pedal by a twisting movement, resulting in the return of the bar 5a and the release of the extension 41. Upon this twisting movement, the oblique lateral walls 38, 39 of the tunnel can cooperate with the lateral surfaces of the cap 26, thereby facilitating lifting of the sole in the region having the wedge 31. Final unfastening is effected when the bar 5a releases the extension 41.

The unfastening angle is defined by the length of the extension 41.

As can be seen in FIG. 1, when the shoe has been fastened to the pedal, the parts of the sole situated on either side of the tunnel 32 bear against the bosses 30 of the pedal.

The shoe fastened to the pedal has a certain lateral freedom of approximately 5 mm as the width of the tunnel 32 is slightly greater than the dimension of the bows 3 and 5 in the direction parallel to the axis 4.

Moreover, the surfaces of the wedge coming to rest at the front against the bars 3a and 5a are inclined, as in the case of FR-A-2653089, so as to allow the shoe angular freedom relative to the pedal, e.g. of more or less 5° on either side of a centre position, without the risk of unfastening.

It should be noted that when it is free, the pedal 1 can swing about the axis 4 towards the rear, especially as a result of vibrations or inertial movements.

In FIG. 4, the pedal 1 has been shown to be inclined towards the rear by an angle of approximately 20° when the sole strikes the pedal for fastening.

By virtue of the arrangement of the projection 19 and the pedal as a whole, the lower edge 20 of the projection 19 (in the position of FIG. 4, this lower edge 20 forms the highest point of the pedal) remains in front of the vertical plane V passing through the axis 4 of the pedal.

When the sole of the shoe strikes this edge 20 in its forward/backward movement and exerts downward pressure, this puts the pedal into a good position to effect fastening under the conditions described hereinbefore.

If necessary, the toe of the shoe can come into contact with the projection 19 at the start of the fastening phase, while the pedal is relatively inclined towards the rear, as shown in FIG. 5. The forward/backward action of the shoe on the projection 19 will bring the pedal 1 into the correct position for fastening.

The wedge 31 can have small dimensions, e.g. a width of the order of 30 mm (dimension in the direction parallel to the axis 4) and can extend by approximately 15 mm in a longitudinal direction on either side of the axis of the pedal.

It should also be noted that when the transverse bars 3a, 5a come to rest against the sole, it bears against the metal blades 46,47 of the wedge, thereby distributing the forces over the rigid insole 34.

When putting on the shoe, the front extension 40 or front hook of the wedge 31 strikes the earth moved by the bar 3a, thereby allowing for correct fastening in spite of the presence of earth or mud in the tunnel 32.

I claim:

1. An assembly of a safety pedal having one face provided with stop and fastening means and a cycling shoe having a sole having a longitudinal direction and provided with a wedge located so as to be situated under the metatarsus of the foot of a cyclist in use, said wedge having a small dimension along the longitudinal axis of the sole, said sole having a recess and said wedge in said recess, said stop and fastening means comprising a front stop and retaining member at the front of said pedal and extending substantially perpendicularly from said one face of said pedal, said pedal having a normally horizontal axis of rotation and said front stop and retaining member being located on the front side of said axis of rotation, said pedal having a rear fastening member located behind said axis of rotation and being displacable relative to said axis of rotation against the action of an elastic return means, said pedal including a central plane and comprising a front having a projection, said projection having an inclined portion, said inclined portion having a lower edge located, relative to said central plane of said pedal, adjacent a face of said pedal opposite said one face, said pedal being formed such that, at rest, said lower edge will be situated above said pedal and in front of a vertical plane passing through said axis of rotation of said pedal, said sole having longitudinal guide means capable of cooperating with said projection and said pedal having longitudinal guide means for mating with said guide means of said sole to ensure that the front part of said sole and said wedge are slidable relative to said pedal while said wedge approaches said front stop member and prevent interference while said wedge approaches between the front of the wedge and said rear fastening member, said pedal having a central plane and being provided with a counterweight positioned so that in said pedals normal rest position, said central plane will be inclined by approximately 30° towards the front with respect to a vertical plane passing through said axis of rotation of the pedal, said projection of said pedal being located, when said pedal is in said rest position, being located vertically above said axis of rotation, said lower edge of said projection remaining in front of said vertical plane even when said pedal assumes a position inclined slightly towards the rear.

2. The assembly as claimed in claim 1 wherein said front projection of said pedal has a contour substantially in the shape of a trapezium having a small base which defines said lower edge.

3. The assembly as claimed in claim 1 wherein said sole has a front part including a zone in which said wedge is located and said longitudinal guide means of said sole comprises a longitudinal cavity in the form of a tunnel having an opening toward said front part, said tunnel having a front part located adjacent the front part of said sole, said front part of said tunnel having a bottom defined by a smooth wall to promote sliding of the stop and fastening means of said pedal against said bottom.

4. The assembly as claimed in claim 3 wherein said tunnel has lateral walls which function as lateral guide means of said shoe, said lateral walls extending obliquely relative to a plane passing through the longitudinal axis of said sole so that a cross section of said tunnel has the shape of a trapezium with a wide base opening in the bottom of said sole and the smaller base lying along the bottom of said tunnel to facilitate attachment of said wedge to said pedal.

5. Assembly according to claim 4, wherein the width of the section of the tunnel in at said wide base is approximately 15 mm greater than the dimension of the front stop member and the rear fastening member of the pedal in the direction parallel to the axis of the pedal, while the width of the section of the tunnel where the lateral walls of the tunnel against which a lateral edge of the front stop member can come to rest is selected to allow for a small degree of freedom to slide laterally, especially of approximately 5 mm.

6. Assembly according to claim 3, wherein said mating longitudinal guide means of the pedal comprises behind the pedal a cap (26), the upper surface (27) of which is capable of sliding against the bottom (33) of the tunnel of the sole and against the wedge (31) to prevent inadvertent fastening of the front part (40) of the wedge (31) to the rear fastening member (5) of the pedal.

7. Assembly according to claim 6, wherein said wedge (31) comprises a curved central part (45) facilitating sliding on said rear fastening member (5).

8. Assembly according to claim 6, wherein the depth of the tunnel (32) and the profile along its bottom are determined as a function of the dimensions of the pedal, the cap and the wedge in order to ensure that, during the forward movement of the shoe, the wedge (31) passes above the rear fastening member (5), and then the front of the pedal (1) pivots upwards sufficiently for fastening.

9. The assembly as claimed in claim 1 wherein said front stop member is a bow of metal wire of circular section and having a central section that extends generally parallel to said axis of rotation of said pedal and located above said one face of said pedal, said bow including two legs extending from said central section of said bow substantially perpendicular to said one face of said pedal, the connection of said legs to said central section being rounded with a sufficient inner radius to ensure good lateral guiding of the sole upon cooperation with a said oblique lateral wall of said tunnel of said sole.

10. The assembly as claimed in claim 9 wherein said wedge has a front and a rear end each provided with extensions of small width and which project along the longitudinal axis of said sole, said extension on said front end having a dimension for engaging under said central section of said bow and into an inlet defined by said bow, said extension on said front end being spaced from the bottom of said recess of said wedge a distance substantially equal to the diameter of said metal wire.

11. The assembly as claimed in claim 10 wherein said wedge has a base for attachment to said sole, said base having two substantially rectangular blades having convex exterior surfaces, said blades being separated by a longitudinal space and extending in the longitudinal direction of said sole, said sole having longitudinal recesses for each receiving a said blade and allowing longitudinal adjustment of said wedge.

12. Assembly according to claim 9, wherein said inner radius of curvature of the corners of the bow is greater than or equal to 6 mm.

13. The assembly as claimed in claim 6 wherein said tunnel has lateral walls and said cap has lateral surfaces adapted to facilitate unfastening of said shoe from said pedal by twisting movement of the foot, said lateral surfaces being dimensioned to cooperate with a said lateral wall of said tunnel.

14. Assembly according to claim 1, wherein the pedal (1) is arranged in such a manner that the lower edge (20) of the said projection (19) remains in front of the vertical plane (V) passing through the horizontal axis of the pedal (1) over an angular range of positions of the pedal up to a position inclined towards the rear by approximately 30°.

15. The assembly as claimed in claim 1 wherein said pedal and shoe are dimensioned so that when the pedal is struck by said sole of said shoe in a movement from the rear towards the front and from the top to bottom for fastening, said pedal tilts substantially horizontally by the initial cooperation of the projection of the pedal with said sole with the central section of said bow then bearing against the bottom of said tunnel of said sole while the cap comes to rest against one of the sole and the wedge as the sole slides forward relative to the pedal, said cap being released from contact when said wedge is fastened to said pedal.

16. An assembly of a safety pedal having one face provided with stop and fastening means and a cycling shoe having a sole having a longitudinal direction and provided with a wedge located so as to be situated under the metatarsus of the foot of a cyclist in use, said wedge having a small dimension along the longitudinal axis of the sole, said sole having a recess and said wedge being located in said recess, said stop and fastening means comprising a front stop and retaining member at the front of said pedal and extending substantially perpendicularly from said one face of said pedal, said pedal having a normally horizontal axis of rotation and said front stop and retaining member being located on the front side of said axis of rotation, said pedal having a rear fastening member located behind said axis of rotation and being displacable relative to said axis of rotation against the action of an elastic return means, said pedal including a central plane and comprising a front having a projection, said projection having an inclined portion, said inclined portion having a lower edge located, relative to said central plane of said-pedal, adjacent a face of said pedal opposite said one face, said pedal being formed such that, at rest, said lower edge will be situated above said pedal and in front of a vertical plane passing through said axis of rotation of said pedal, said sole having longitudinal guide means capable of cooperating with said projection and said pedal having longitudinal guide means for mating with said guide means of said sole to ensure that the front part of said sole and said wedge are slidable relative to said pedal while said wedge approaches said front stop member and prevent interference while said wedge approaches between the front of the wedge and said rear fastening member, said sole having a front part including a zone in which said wedge is located and said longitudinal guide means of said sole comprising a longitudinal cavity in the form of a tunnel having an opening toward said front part, said tunnel having a front part located adjacent said front part of said sole, said front part of said tunnel having a bottom defined by a smooth wall to promote sliding of the stop and fastening means of said pedal against said bottom, said longitudinal guide means further including a bulge having an upper surface, said bulge extending from said one face of said pedal, said upper surface being capable of sliding against at least one of said tunnel of the sole and against said wedge to prevent inadvertent fastening of said front part of said wedge to said rear fastening member of said pedal.

* * * * *